(12) United States Patent
Kataoka

(10) Patent No.: US 7,042,135 B2
(45) Date of Patent: May 9, 2006

(54) CURRENT DETECTION CIRCUIT AND CURRENT DETECTION METHOD

(75) Inventor: Kenichi Kataoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/979,562

(22) Filed: Nov. 2, 2004

(65) Prior Publication Data

US 2005/0104475 A1    May 19, 2005

(30) Foreign Application Priority Data

Nov. 14, 2003 (JP) .............................. 2003-385189

(51) Int. Cl.
*H01L 41/08* (2006.01)
(52) U.S. Cl. .................. 310/319; 310/316.01
(58) Field of Classification Search ................ 310/314, 310/317, 319, 316.01; 331/46; 315/209
See application file for complete search history.

(56) References Cited

U.S. PATENT DOCUMENTS

| RE35,043 E * | 9/1995 | Takeda .......................... 368/205 |
| 5,856,728 A * | 1/1999 | Zimnicki et al. ..... 315/209 PZ |
| 6,448,689 B1 * | 9/2002 | Satoh ...................... 310/316.01 |
| 6,788,155 B1 * | 9/2004 | Chaudhuri et al. ........... 331/46 |

FOREIGN PATENT DOCUMENTS

| JP | 62-002869 | | 1/1987 |
| JP | 62-2869 | * | 8/1987 |
| JP | 01-136575 | | 5/1989 |

* cited by examiner

*Primary Examiner*—Mark Budd
(74) *Attorney, Agent, or Firm*—Morgan & Finnegan, L.L.P.

(57) ABSTRACT

A current detection circuit which applies an AC voltage to a vibrator (1) which converts electricity into a mechanical energy to vibrate, and detects a mechanical branch current serving as a current component which contributes to the vibration of the vibrator (1), includes a series circuit which connects a capacitor (4) to the vibrator (1) in series, voltage dividing circuits (5, 6), connected to the series circuit in parallel, for dividing and extracting a voltage applied across the series circuit, and a detection circuit (7) for detecting a difference between, of the divided voltages, a terminal voltage other than the voltage applied across the series circuit and a voltage at a connection portion between the vibrator and the capacitor in the series circuit.

13 Claims, 13 Drawing Sheets

CURRENT DETECTION CIRCUIT AND CURRENT DETECTION METHOD

FIELD OF THE INVENTION

The present invention relates to the mechanical branch current detection technique of a vibration actuator such as a piezoelectric vibrator and ultrasonic motor.

BACKGROUND OF THE INVENTION

For example, in Japanese Patent Application Laid-Open No. 62-2869, a voltage equal to a voltage applied to a vibrator is applied to a reference capacitor having an electrostatic capacitance equal to that of the damping admittance of the vibrator. Currents flowing in the capacitor and vibrator are detected to obtain a difference between them, thereby detecting a mechanical branch current.

In Japanese Patent Application Laid-Open No. 1-136575, opposite-phase voltages are respectively applied to the vibrator and the reference capacitor by using a transformer with a center tap. Each of the currents is fed back to the center tap via a resistor to directly detect the mechanical branch current.

The mechanical branch current will now be described more specifically. A piezoelectric element alone or an elastic body to which a piezoelectric element is adhered has an equivalent circuit seen from a terminal of the piezoelectric element, as shown in FIG. 2. Reference symbol electric capacitance C0 denotes a damping admittance; and mass L, mechanical elastic constant C, and mechanical loss R, dynamic admittances. A current flowing in the dynamic admittances represents a mechanical branch current; and a current flowing in the damping admittance C0, an electrical branch current.

In the above-described prior art, a circuit which converts the currents flowing in the vibrator and capacitor into the voltages is required. When the resistor converts the current into the voltage, power consumption undesirably increases. Hence, a resistance value for converting the voltage into the current needs to be small, the detection voltage becomes low, and an amplifier must be used.

In order to compensate for a change in damping admittance in accordance with changes in temperature and individual difference, a complex circuit is required. For example, the capacitance needs to become variable, or the currents flowing in the vibrator and the capacitor need to be individually detected, the gain of one current is controlled, and then the difference between the currents is obtained.

SUMMARY OF THE INVENTION

The present invention has been made in consideration of the above problems, and has as its object to provide a technique which does not need a current detection resistor, and can detect a mechanical branch current without affecting the vibration of a piezoelectric vibrator.

In order to solve the above problems and achieve the object, in the present invention, there is provided a current detection circuit which applies an AC voltage to a vibrator which converts electricity into a mechanical energy to vibrate, and detects a mechanical branch current serving as a current component which contributes to the vibration of the vibrator, comprising a series circuit which connects a capacitor to the vibrator in series, voltage dividing means, connected to the series circuit in parallel, for dividing and extracting a voltage applied across the series circuit, and detection means for detecting a difference between, of the divided voltages, a terminal voltage other than the voltage applied across the series circuit and a voltage at a connection portion between the vibrator and the capacitor in the series circuit.

In the above-described circuit, the voltage dividing means includes a voltage dividing circuit having two or more voltage dividing ratios, and selection means for selecting one of the divided voltages, and the detection means detects a difference between the selected voltage and the voltage at the connection portion between the vibrator and the capacitor.

In the above-described circuit, the detection means includes first detection means for detecting the voltage at the connection portion, second detection means for detecting the voltage applied cross the series circuit or the voltage obtained by dividing the voltage applied across the series circuit, and third detection means for detecting a phase difference between the voltages, wherein a value corresponding to the mechanical branch current is detected by using output values from the first detection means and second detection means.

In the above-described circuit, the voltage dividing circuit is arranged by connecting a plurality of resistance elements in series.

In the above-described circuit, the circuit further comprises differentiating means for differentiating a detection value of an output voltage from the detection means.

In the above-described circuit, the differentiating means includes first differentiating means and second differentiating means for differentiating the voltage at the connection portion and the divided voltage, respectively, and the detection means detects a difference between differentiating values of the first differentiating means and second differentiating means.

In the above-described circuit, the differentiating means detects a gradient close to an average of detection values from the detection means.

In the present invention, there is provided a method of applying an AC voltage to a vibrator, and detecting a mechanical branch current serving as a current component which contributes to a vibration of the vibrator in a circuit including a series circuit in which a capacitor is connected in series to the vibrator which converts electricity into a mechanical energy to vibrate, and voltage dividing means, connected to the series circuit in parallel, for dividing a voltage applied across the series circuit, comprising the steps of extracting, of the divided voltages, a terminal voltage other than the voltage applied across the series circuit, detecting a difference between the extracted voltage and a voltage at a connection portion between the vibrator and the capacitor in the series circuit, and detecting the mechanical branch current by using the detection result.

In the above-described method, the voltage dividing means includes a voltage dividing circuit having two or more voltage dividing ratios, the voltage dividing circuit selects one of the divided voltages, and detects a difference between the selected voltage and the voltage at the connection portion between the vibrator and the capacitor.

In the above-described method, when applying the AC voltage with a predetermined frequency, the selecting comprises selecting a voltage with a minimum amplitude of the divided voltages.

As described above, the present invention does not need a current detection resistor, and can detect the mechanical branch current without affecting the vibration of the piezoelectric vibrator. Since the optimal voltage dividing ratio can be selected, the mechanical branch current can be detected more acurately.

Other objects and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Embodiments of the present invention will be described in detail with reference to the accompanying drawings.

Note that the following embodiments are merely examples as implementing means of the present invention, and can be applied to various changes and modifications without departing from the spirit and scope of the present invention.

[First Embodiment]

Figure 1:
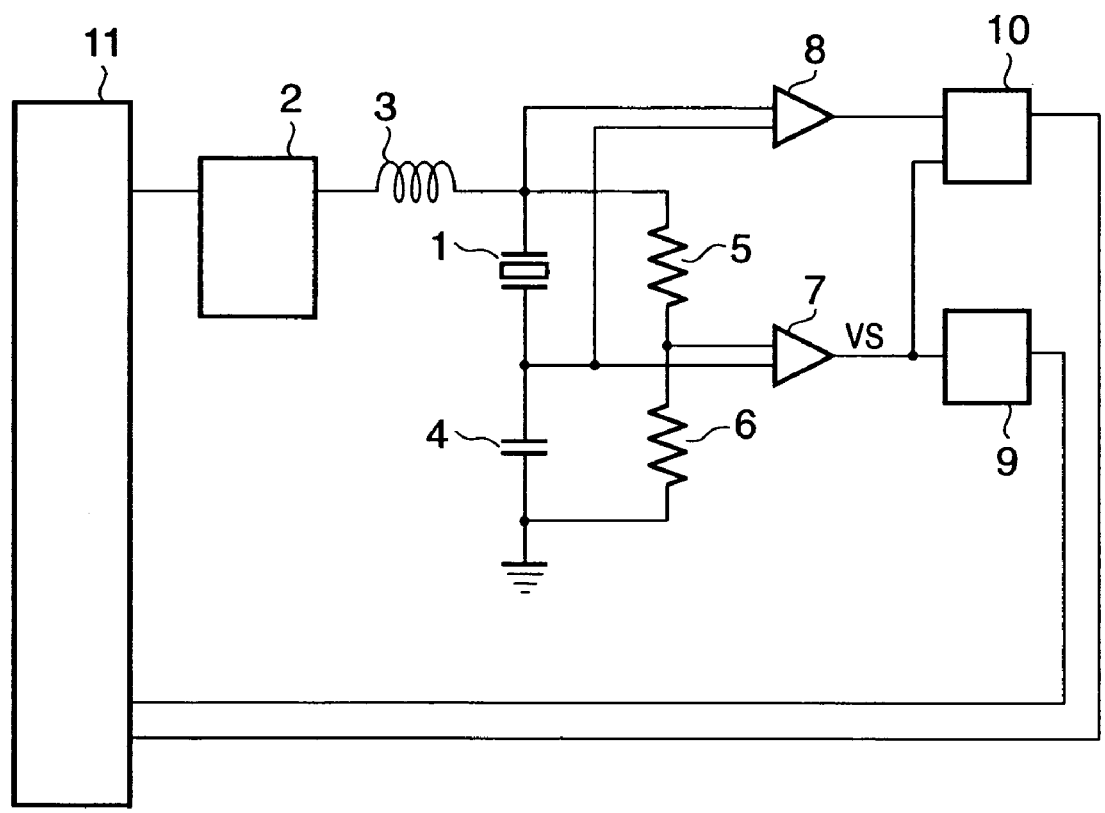
FIG. 1 a diagram of a mechanical branch current detection circuit according to the first embodiment.

FIG. 1 is a diagram of a mechanical branch current detection circuit according to the first embodiment. Reference numeral 1 denotes a piezoelectric vibrator; 2, a pulse generating means for outputting to the piezoelectric vibrator 1 a pulse having a frequency corresponding to a frequency command output from a CPU 11 (described below); 3, an inductor element which suppresses a rush current; 4, a capacitor for detecting a mechanical branch current flowing in the piezoelectric vibrator 1; 5 and 6, voltage dividing resistors each of which detects the mechanical branch current; 7, a differential amplifier which detects a difference between the voltage applied to a connection portion between the piezoelectric vibrator 1 and capacitor 4 and that applied to a connection portion between the voltage dividing resistors 5 and 6; 8, a differential amplifier which detects a voltage applied across the piezoelectric vibrator 1; 9, an amplitude detection means for detecting the amplitude of an output voltage from the differential amplifier 7; 10, a phase difference detection means for detecting a phase difference between the applied voltage to the piezoelectric vibrator 1 and the output voltage from the differential amplifier 7; and 11, the CPU which receives the amplitude and phase difference information from the differential amplifier 8 and phase difference detection means 10 to output a frequency command signal to the pulse generating means 2.

Figure 2:
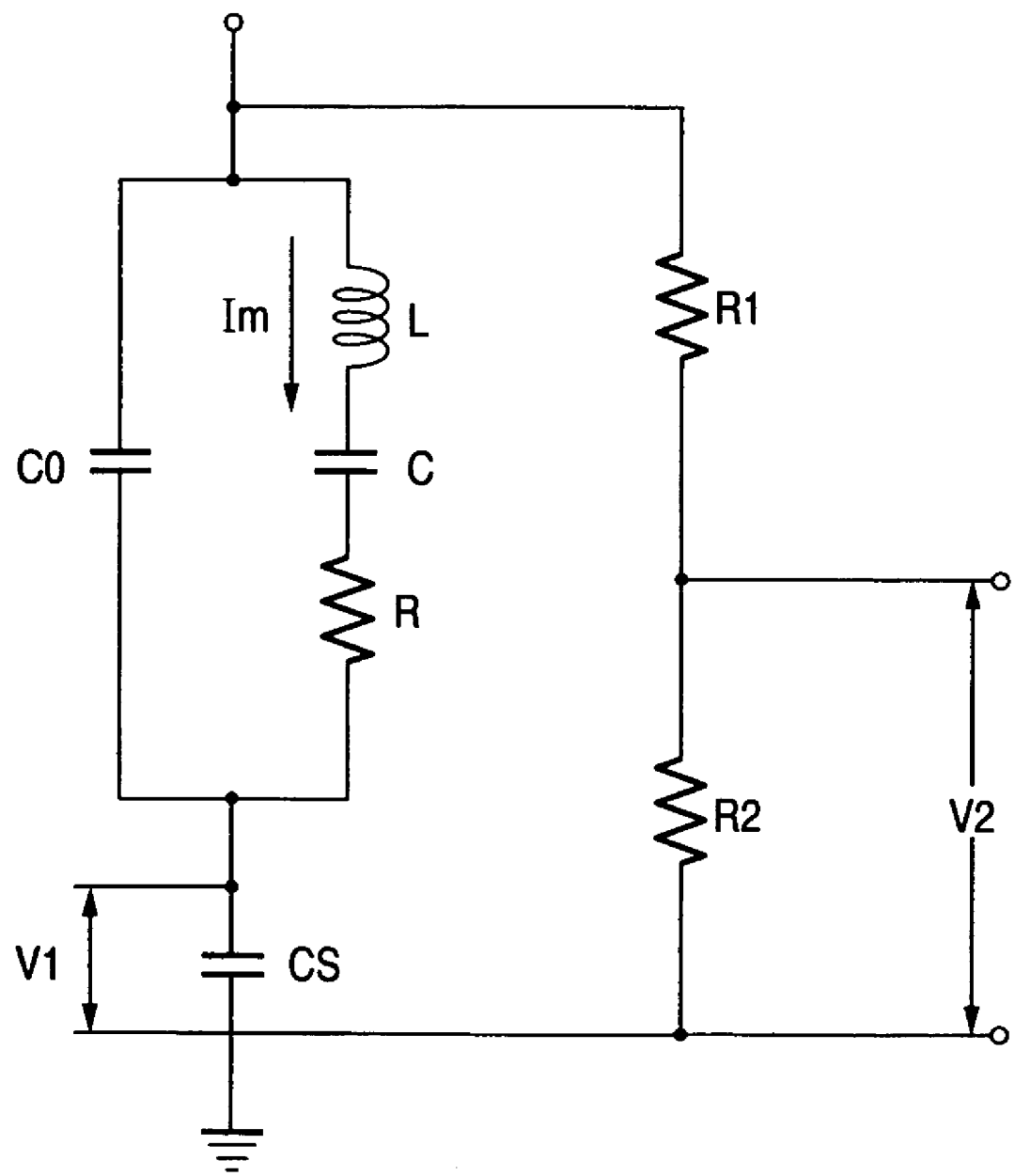
FIG. 2 is a circuit diagram of an equivalent circuit of a piezoelectric vibrator.

FIG. 2 is a circuit diagram around the piezoelectric vibrator 1 when showing the piezoelectric vibrator 1 in an equivalent circuit. The principle of detection of the mechanical branch current will be described below with reference to FIG. 2.

A mechanical branch current Im can be obtained by $$Im = \frac{j\omega(aC0)}{K - 1 + j\omega(K + Ka - 1)C0\left(R + j\left(\omega L - \frac{1}{\omega C}\right)\right)}(V1 - V2) \quad (1)$$

where $AC0(=CS)$ is the electrostatic capacitance of the capacitor 4, $C0$ is the electrostatic capacitance of the damping admittance of the piezoelectric vibrator 1, $V1$ is the voltage applied to the connection portion between the piezoelectric vibrator 1 and capacitor 4, $V2$ is the voltage-divided output voltage from the voltage dividing resistors 5 and 6, $\omega$ is a driving angular frequency, and $K=R2/(R1+R2)$ where $R1$ is the resistance value of the voltage dividing resistor 5, and $R2$ is the resistance value of the voltage dividing resistor 6.

The mechanical branch current Im can also be obtained by $$Im = -j\omega(1+a)C0(V1-V2) \quad (2)$$

for $K=1/(1+a)$.

Equation (2) is modified to obtain an output voltage (V1−V2) by $$V1 - V2 = -j\frac{1}{\omega(1+a)C0}Im \quad (3)$$

For example, when selecting the electrostatic capacitances of the damping admittance C0 and capacitor CS to be equal to each other, $a=1$. Hence, the output voltage is obtained by multiplying the mechanical branch current Im by a value half the impedance of C0. Also, the phase of the output voltage is leading by 90° from the mechanical branch current Im. When $K=1/2$, $R1=R2$. Also, if $CS=aC0$, $R1=aR2$. Hence, even when the value of C0 is not equal to that of CS, the mechanical branch current can be detected by changing the ratio of R1 and R2.

In this method, as compared with a conventional current detection method using a resistor, a power loss is smaller by an amount corresponding to the absence of a resistor in a current path to the piezoelectric vibrator 1. Additionally, the relatively high voltage can be detected since the current is detected using the impedance of the damping admittance. For example, when $C0=10$ [nF], the current can be detected by multiplying the amplitude of the mechanical branch current 275 times, provided that a and the frequency are set to 1 and 30 (KHz), respectively. Note that since R1 and R2 are merely used as only the voltage dividing means, the voltage dividing circuit may be arranged by a capacitor, inductor, and the like.

Therefore, the amplitude of the output voltage from the differential amplifier 7 is proportional to that of the mechanical branch current. The amplitude detection means 9 converts the amplitude of an AC voltage into a DC voltage by using a circuit for obtaining an effective value and a rectifying means such as a diode. The output from the differential amplifier 7 is then input to the CPU 11 by using an A/D conversion means (not shown). The phase difference detection means 10 detects a phase difference between the voltage applied to the piezoelectric vibrator 1 and the output voltage from the differential amplifier 7, and then outputs the phase difference to the CPU 11. For example, the CPU 11 controls the mechanical branch current to a predetermined amplitude, and also controls the phase difference between the mechanical branch current and the applied voltage to a predetermined value. When the value of the mechanical branch current is smaller than the predetermined value, or the phase difference between the mechanical branch current and the applied voltage is larger than a predetermined value, the CPU 11 operates such that a driving frequency comes close to a resonance frequency. Otherwise, the CPU 11 operates such that the driving frequency is separated from the resonance frequency. In order to control the amplitude of the mechanical branch current, the CPU 11 may control a voltage amplitude in place of the frequency of the applied voltage as an operational parameter. When the mechanical branch current is smaller than the predetermined value, the CPU controls the amplitude of the applied voltage to be large. Otherwise, the CPU controls the amplitude of the applied voltage to be small.

Note that when monitoring the resonance state of the piezoelectric vibrator 1 by using the information of the phase difference between the applied voltage and the mechanical branch current, the phase shift of 90° from the actual value must be considered. When calculating the phase difference between the driving voltage and the mechanical branch current, the detected phase must be shifted by 90°.

The phase of the value corresponding to the mechanical branch current obtained in equation (3) is leading from that of the actual mechanical branch current, and is inversely proportional to an angular frequency. No problem is posed when the driving frequency is fixed. However, in order to control the amplitude by operating the driving frequency, the proportionality between the mechanical branch current and the detection value is slightly shifted. As a measure against this problem, the differentiating circuit which differentiates a detection signal may be added. This process is shown in the following equations. The actual waveform of the mechanical branch current is given by $$Im = Im0(\cos \omega t + j \sin \omega t) \quad (4)$$

From equation (3), $$V1 - V2 = \frac{1}{\omega(1+a)C0} Im0(j\cos\omega t - \sin\omega t) \quad (5)$$

Equation (5) is differentiated by $$(V1 - V2)' = -\frac{1}{(1+a)C0} Im0(j\sin\omega t + \cos\omega t) = \frac{1}{(1+a)C0} Im \quad (6)$$

Figure 3:
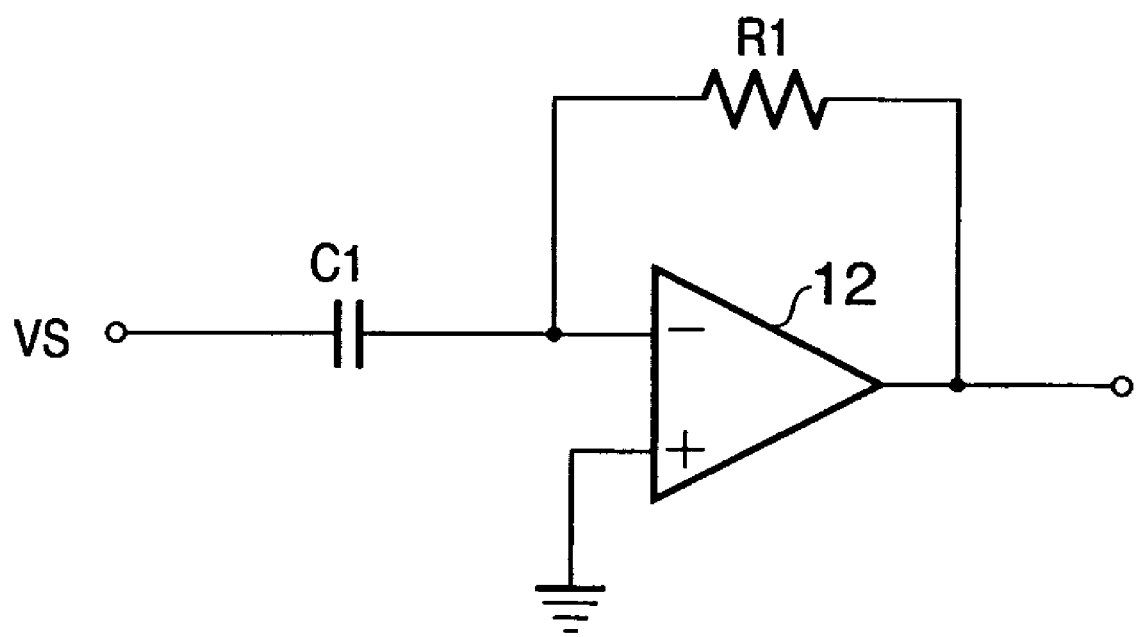
FIG. 3 is a circuit diagram showing an example of a differentiating circuit.

From equation (6), the sign of the output voltage is changed with respect to the mechanical branch current by differentiating the output voltage. However, the amplitude value is not changed even if the angular frequency ω is changed. FIG. 3 shows an example of the differentiating circuit. Reference numeral 12 denotes an operational amplifier. The gain G of this differentiating circuit is obtained by $$G = -j\omega C1 R3 \quad (7)$$

where C1 is the electrostatic capacitance of the capacitor, and R3 is the resistance value of a feedback resistor.

Therefore, equation (5) is multiplied by equation (7) by $$(V_1 - V_2)G = \frac{C1R3}{(1+a)C0} Im0(\cos\omega t + j\sin\omega t) = \frac{C1R3}{(1+a)C0} Im \quad (8)$$

From equation (8), the amplitude value does not change even if the angular frequency ω changes, as in equation (6). Since the gain is negative, the phase matches that of the mechanical branch current.

As described above, the differential operation can be executed in a simple circuit arrangement, and the mechanical branch current can be accurately detected by adding the differentiating circuit.

Figure 4:
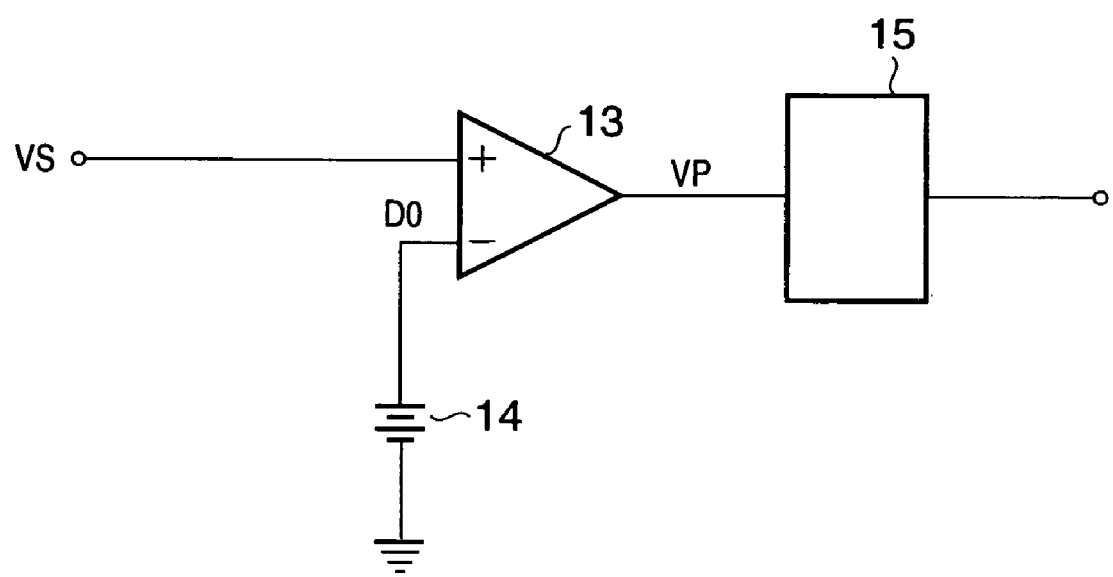
FIG. 4 is a circuit diagram showing an example of a digital differentiating circuit.
Figure 5:
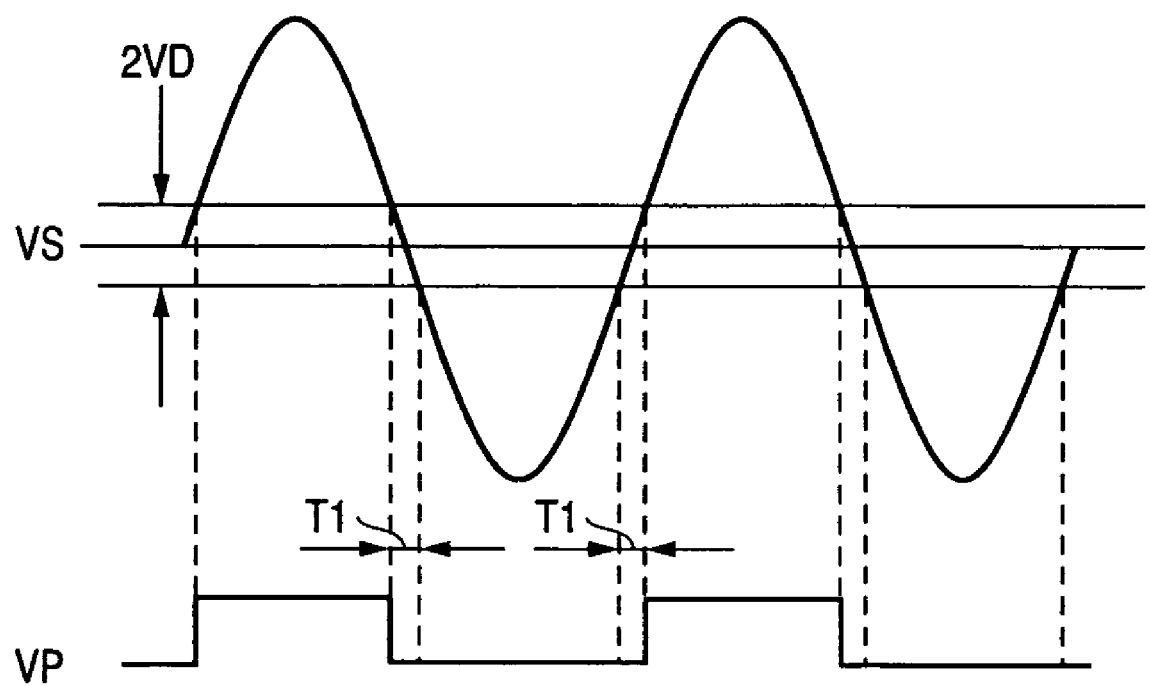
FIG. 5 is a timing chart showing a waveform of each portion in the digital differentiating circuit.

Assume that the phase of the mechanical branch current is not important for an application. In order to obtain only the amplitude of the mechanical branch current, the gradient of the waveform at the center (the waveform average or about 0) of the waveform in equation (3) or (5) can be detected. FIG. 4 shows an example. Reference numeral 13 denotes a comparator; and 14, a reference voltage generating means 14. The reference voltage generating means generates a voltage D0 with a waveform slightly shifted from the center of the waveform. The comparator 13 compares an output signal VS from the differential amplifier 7 and the reference voltage D0, to output a signal at high level when the output from the differential amplifier 7 is larger than the reference voltage D0. The duty of the output signal from the comparator 13 slightly shifts from the duty of 50%, and a time at high level is different from that at low level. Reference numeral 15 denotes a pulse measurement means for detecting a difference between the time at high level and that at low level. FIG. 5 shows waveforms of the respective parts in the circuit in FIG. 4. As shown in FIG. 5, the time difference between high level and low level is 2T1. Gradient G1 is obtained by $$G1 = \frac{2VD}{T1} \quad (9)$$

where VD is the voltage of the reference signal D0 at the center of the waveform of the signal VS.

G1 corresponds to the amplitude in equation (6), and becomes a value corresponding to the amplitude of the mechanical branch current independent of the angular frequency ω. Since the frequency has been known in advance, the value corresponding to the amplitude of the mechanical branch current independent of the frequency can be obtained by detecting the mechanical branch current and then multiplying the detection value by the frequency. Since the vibration actuator generally has the driving voltage with a plurality of phases in detecting the mechanical branch current of the vibration actuator, the mechanical branch currents with the respective phases can be detected. However, when the phases of the plurality of currents are almost the same, it suffices a mechanical branch current with one phase is detected as a representative, and the values of the phases of the remaining currents are made almost equal to that of the detected phase. Also, the mechanical branch current can be detected even when changing the order of the piezoelectric vibrator 1 and capacitor 4.

[Second Embodiment]

Figure 6:
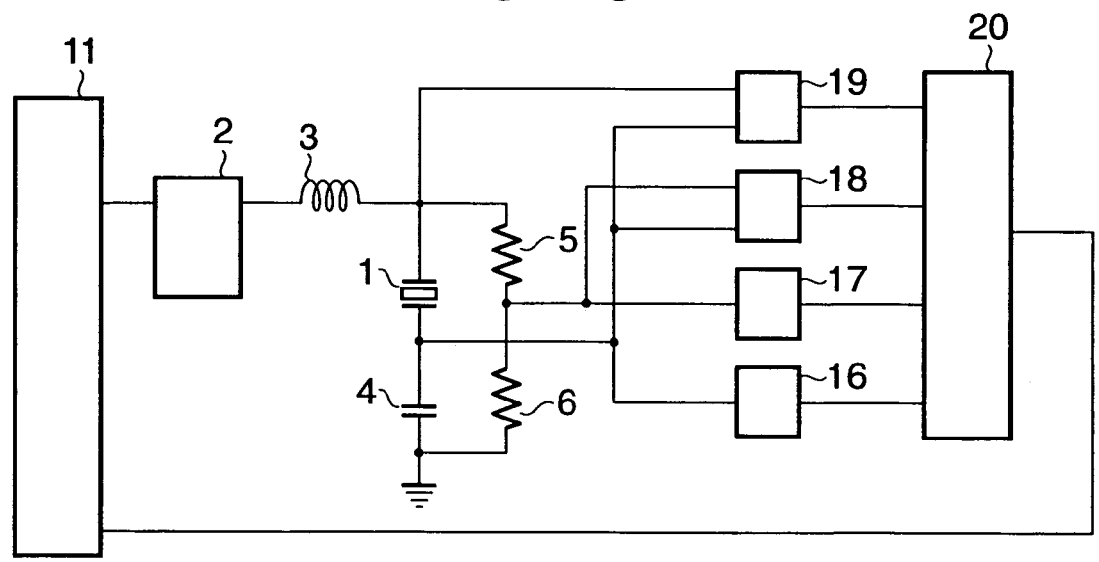
FIG. 6 is a diagram of a mechanical branch current detection circuit according to the second embodiment.

FIG. 6 is a diagram of a mechanical branch current detection circuit according to the second embodiment. Reference numeral 16 denotes an amplitude detection means for detecting the voltage amplitude of a connection portion between a piezoelectric vibrator 1 and a capacitor 4; 17, an amplitude detection means for detecting the voltage amplitude of a connection portion between voltage dividing resistors 5 and 6; 18, a phase difference detection means for detecting a phase difference between the voltage of the connection portion between the piezoelectric vibrator 1 and the capacitor 4, and that at the connection portion between the voltage dividing resistors 5 and 6; 19, a phase difference detection means for detecting a phase difference between a voltage applied to the piezoelectric vibrator 1 and that of the connection portion between the piezoelectric vibrator 1 and the capacitor 4; and 20, a calculation means for receiving outputs from the amplitude detection means 16 and 17 and outputs from the phase detection means 18 and 19 to obtain the amplitude and phase of the difference voltage between the voltage at the connection portion between the piezoelectric vibrator 1 and the capacitor 4 and that of the connection portion between the voltage dividing resistors 5 and 6. The calculation means 20 calculates a phase difference PS between the difference voltage and the voltage applied across the piezoelectric vibrator 1, and the amplitude VS of the difference voltage.

The amplitude VS and the phase difference PS can be obtained by $$VS = \sqrt{VC^2 + VR^2 - 2 \cdot VC \cdot VR\cos\phi} \qquad (10)$$

$$PS = \text{Tan}^{-1}\left(\frac{(VC+VR)}{(VC-VR)}\tan\left(\frac{\phi}{2}\right)\right) - \text{Tan}^{-1}\left(\frac{VC+(1+a)VR}{(VC-(1+a)VR)}\tan\left(\frac{\phi}{2}\right)\right) \qquad (11)$$

where VC is the output from the amplitude detection means 16, VR is the output from the amplitude detection means 17, φ is the output from the phase difference detection means 18. In equation (11), $\phi_0$ which is the output from the phase difference detection means 19 may be used instead of φ.

As described above, the amplitude and phase of the waveform difference can also be obtained by obtaining the respective amplitudes and relative phase differences of the voltage of the connection portion between the piezoelectric vibrator 1 and capacitor 4 and that of the connection portion between the voltage dividing resistors 5 and 6. The value of PS is shifted by 90° from the actual mechanical branch current. Hence, as in the first embodiment, the phase needs to shift by 90° to detect the resonance state. Note that the phase difference between the applied voltage and mechanical branch current in the resonance state is generally 90°. In order to shift the phase by 90°, a differentiating means can be used as in the first embodiment other than a simple subtraction process. In the first embodiment, the differentiating means is inserted to the output of the differential amplifier 7. However, in this embodiment, the differentiating means are inserted after the amplitude detection means 16 and 17, respectively. The differentiating means is arranged as shown in FIGS. 3 and 4. In this embodiment, the amplitude detection means 17 detects the amplitude of the voltage divided by the voltage dividing resistors 5 and 6. However, the amplitude detection means 17 may detect the undivided voltage at the connection portion between the inductor element 3 and the piezoelectric vibrator 1, and the calculation means 20 may multiply the value corresponding to the voltage dividing ratio of the voltage dividing resistors 5 and 6 by the output value from the amplitude detection means 17, to divide the voltage.

[Third Embodiment]

Figure 7:
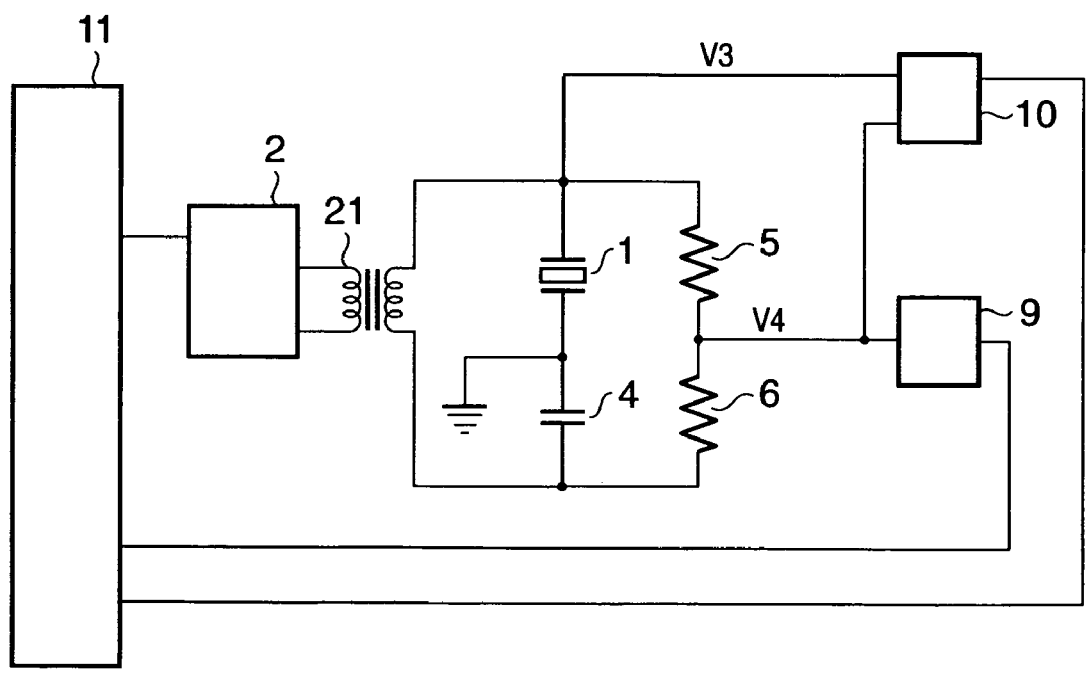
FIG. 7 is a diagram of a mechanical branch current detection circuit according to the third embodiment.

FIG. 7 is a diagram of a mechanical branch current detection circuit in the third embodiment. In the above embodiments, a voltage is applied to a piezoelectric vibrator 1 via an inductor in the series circuit of the piezoelectric vibrator 1 and a capacitor 4, to ground the capacitor 4. However, in this embodiment, a voltage is applied across the series circuit of the piezoelectric vibrator 1 and capacitor 4 via a transformer to ground a connection portion between the piezoelectric vibrator 1 and the capacitor 4.

In FIG. 7, reference numeral 21 denotes a transformer. In this embodiment, the voltage at the connection portion between the piezoelectric vibrator 1 and the capacitor 4 is 0V. Hence, although the differential amplifier 7 detects the mechanical branch current in the above embodiments, the voltage at the connection portion between voltage dividing resistors 5 and 6 represents a signal corresponding to the mechanical branch current in this embodiment. Therefore, from equation (3), the voltage V4 at the connection portion of the voltage dividing resistors 5 and 6 is obtained by $$V4 = j\frac{1}{\omega(1+a)C0}Im \qquad (12)$$

A phase difference detection means 10 detects a phase difference between an applied voltage V3 and the voltage V4 corresponding to the mechanical branch current, thereby detecting the resonance state of the piezoelectric vibrator 1. Note that since the phase of the voltage at the connection portion between the voltage dividing resistors 5 and 6 is 90° leading from that of the mechanical branch current, the phase shift of 90° must be considered in detecting the resonance state. Also, the phase shift of 90° may be corrected by differentiating the output voltage at the connection portion between the voltage dividing resistors 5 and 6 as in the above embodiments.

Figure 8:
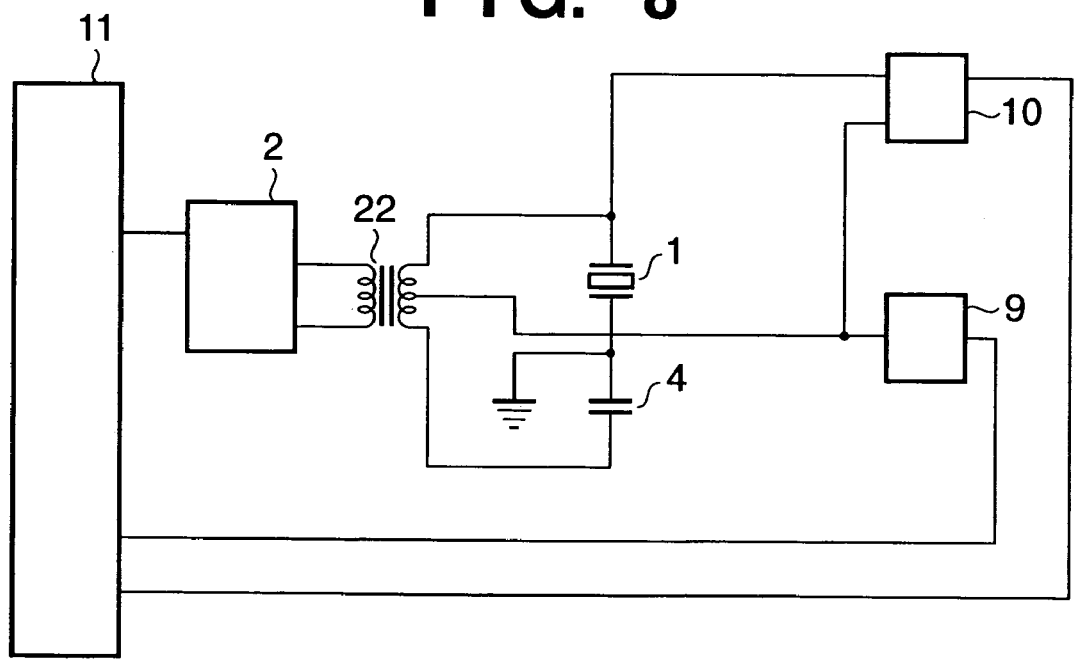
FIG. 8 is a diagram showing an example of a voltage dividing circuit.

In this embodiment, the voltage dividing resistors 5 and 6 are used as voltage dividing means. However, an intermediate tap may be arranged on the secondary side of the transformer to apply a driving voltage and also output the divided voltage. FIG. 8 shows an example of this arrangement. Reference numeral 22 denotes a transformer with a center tap on the secondary side. When C0=CS for a=1 in equation (12), the intermediate tap may serve as the center tap which is a median on the secondary side.

[Fourth Embodiment]

Figure 9:
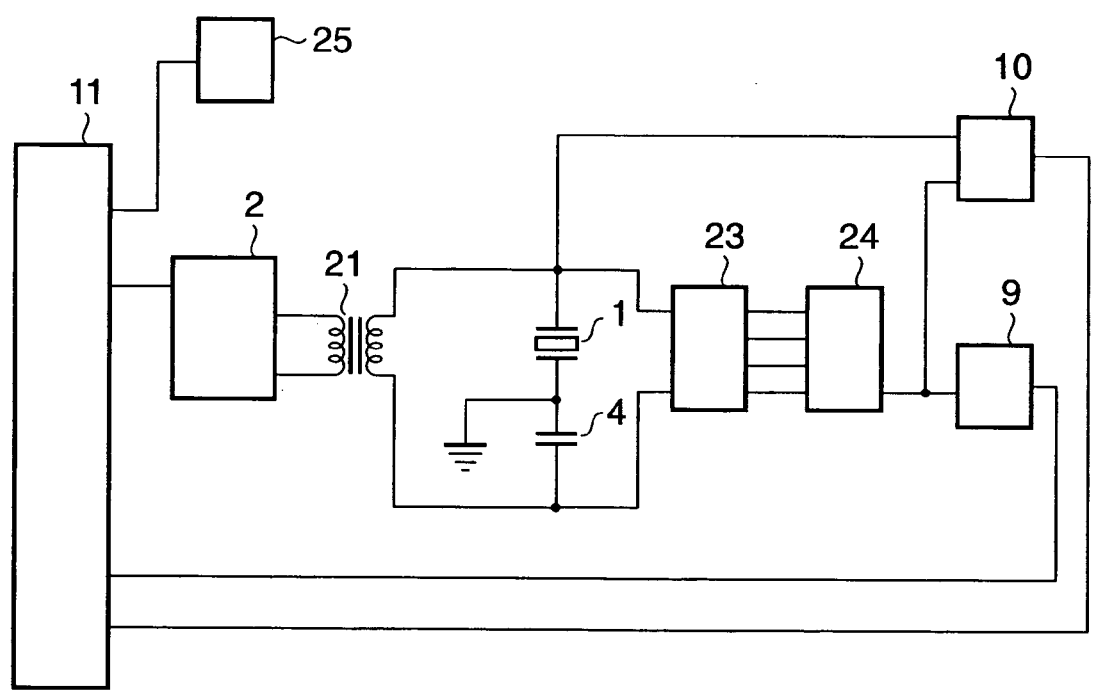
FIG. 9 is a diagram of a mechanical branch current detection circuit according to the fourth embodiment.

FIG. 9 is a diagram of a mechanical branch current detection circuit in the fourth embodiment. In this embodiment, there are three or more voltage dividing resistors. Of course, a voltage dividing element may be a capacitor or inductor in addition to the resistor. Reference numeral 23 denotes a voltage dividing means which has output terminals corresponding to a plurality of voltage dividing ratios; 24, a selection means for selecting one of output voltages of the plurality of output terminals of the voltage dividing means; and 25, a temperature sensor. Since the value of damping admittance C0 of a piezoelectric vibrator 1 changes in accordance with temperatures, the ratio of the value of C0 and that of CS of a capacitor 4 undesirably changes. Hence, the voltage dividing ratio of the voltage dividing means needs to be modified in accordance with the change in ratio. Thus, a relationship between a temperature detected by the temperature sensor 25 in advance and the optimal voltage dividing ratio is obtained to store data. When detecting the mechanical branch current, the voltage dividing ratio is determined from the data stored in accordance with the temperature detected by the temperature sensor 25. The selection means 24 then selects an output terminal of the output terminal 23 corresponding to the voltage dividing ratio, to output the voltage.

Figure 10:
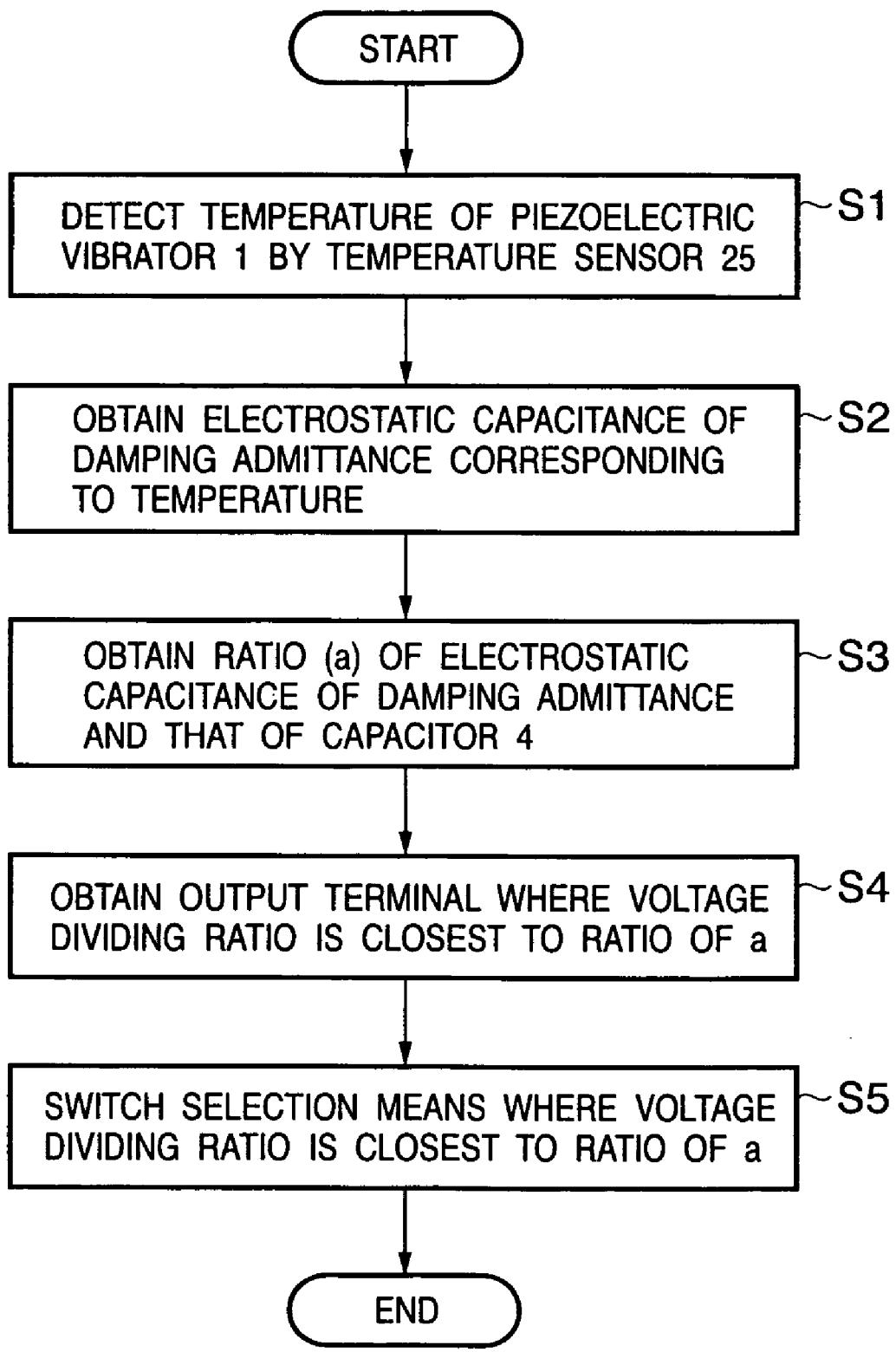
FIG. 10 is a flowchart showing an operation according to the fourth embodiment.

FIG. 10 is a flowchart of a method of changing the voltage dividing ratio.

First, the temperature sensor 25 detects the temperature of the piezoelectric vibrator 1 (step S1).

The electrostatic capacitance of a damping admittance corresponding to the temperature is referred to from the data (step S2).

The ratio (a) of the referred electrostatic capacitance and that of the capacitor 4 is obtained (step S3).

An output terminal where the voltage dividing ratio of the voltage dividing means 23 is closest to the ratio of (a) is determined (step S4).

Finally, the selection means 24 selects the output terminal determined by the selection means 24 to output the voltage.

As described above, the voltage dividing ratio which is most suitable to detect the mechanical branch current is selected. Also, the voltage signal corresponding to the mechanical branch current can be detected by, e.g., differentiating the output from the selection means 24 as in the conventional case.

[Fifth Embodiment]

In the fourth embodiment, the relationship between temperature and voltage dividing ratio is obtained in advance. However, in this embodiment, an AC voltage with a predetermined frequency is applied such that a piezoelectric vibrator 1 hardly vibrates, and the voltage dividing ratio is set such that the voltage value output from a voltage dividing means 23 is smaller than a predetermined amplitude. That is, when the piezoelectric vibrator 1 hardly vibrates, the mechanical branch current is small. Hence, a selection means 24 selects a terminal with the smallest amplitude of the output terminals of the voltage dividing means 23.

Figure 11:
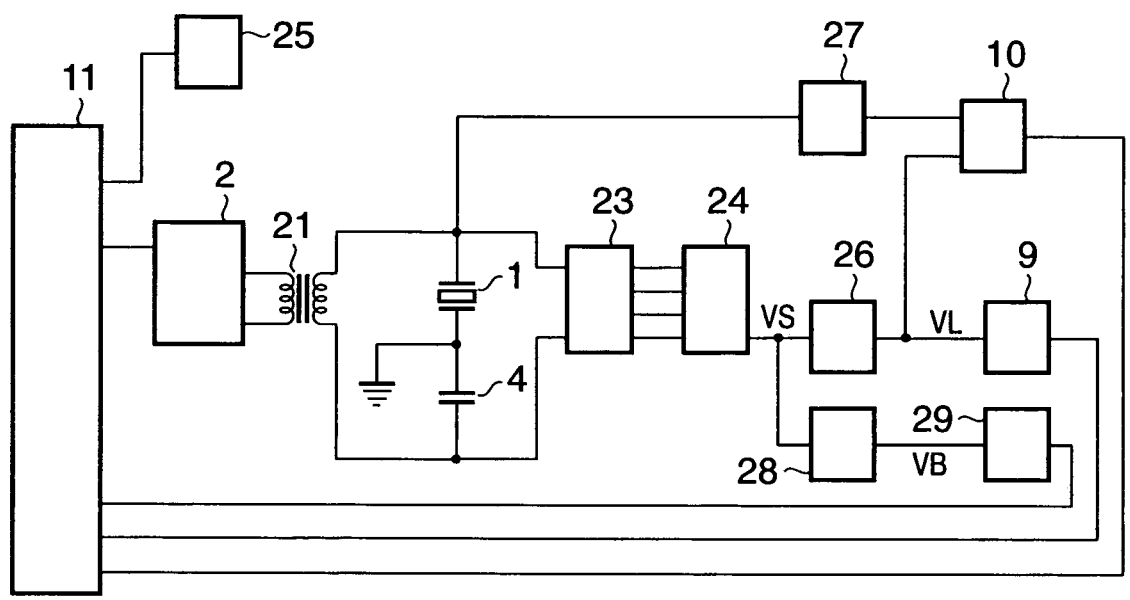
FIG. 11 is a diagram of a mechanical branch current detection circuit according to the fifth embodiment.

FIG. 11 is a diagram of a mechanical branch current detection circuit in the fifth embodiment. Reference numerals 26 and 27 denote low-pass filters. The low-pass filter 26 detects a signal in a main vibration frequency range of the piezoelectric vibrator 1 from the output signals from the selection means 24. The low-pass filter 27 detects the signal in the main vibration frequency range of the piezoelectric vibrator 1 from the voltages applied to the piezoelectric vibrator 1. Reference numeral 28 denotes a bandpass filter which detects the signal of a harmonic component contained in a driving voltage, from the output signals from the selection means 24; and 29, an amplitude detection means for detecting the amplitude of the output signal from the bandpass filter 28.

Figure 12A:
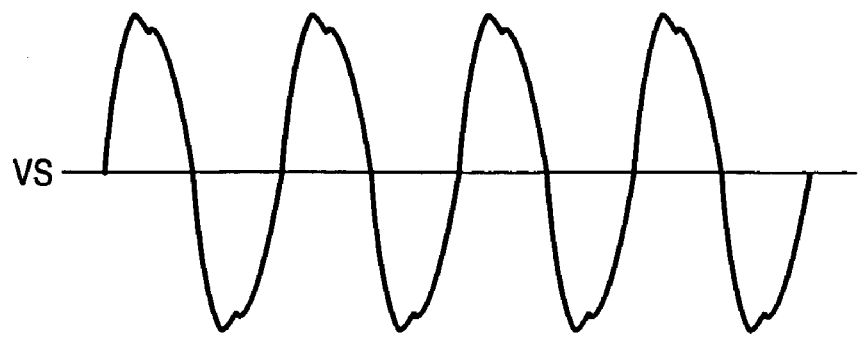
FIGS. 12A to 12C are timing charts showing waveforms of respective portions according to the fifth embodiment.
Figure 12B:
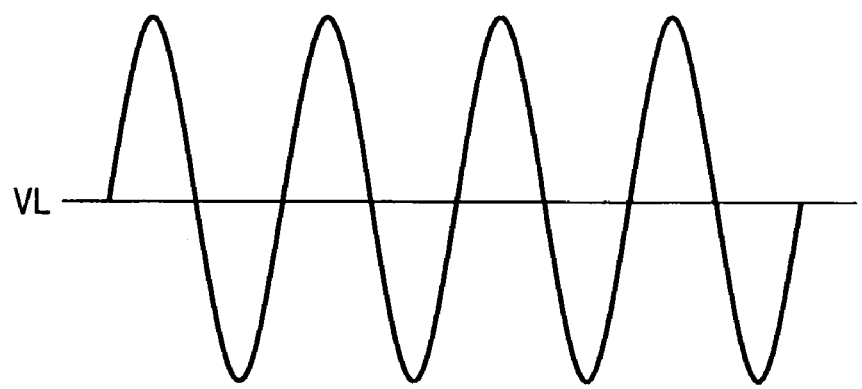
Figure 12C:
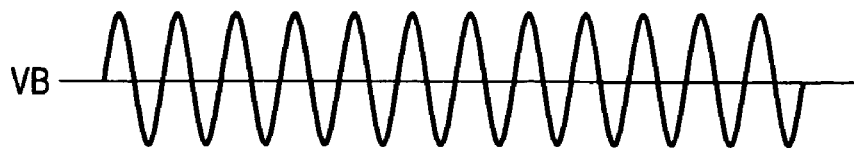

FIGS. 12A to 12C are timing charts showing waveforms of respective portions. Since the driving voltage applied to the piezoelectric vibrator 1 has a voltage waveform VS which deforms in a vertically symmetrical trapezoid, the driving voltage contains an odd-numbered harmonic component. Therefore, when the band of the bandpass filter 28 has a characteristic corresponding to a frequency 3 times the frequency of the AC voltage, and the band of the low-pass filter 26 has a characteristic corresponding to a frequency 1.5 times the resonance frequency of the piezoelectric vibrator 1, the harmonic component and a fundamental wave can be detected. As a result, an output VL of the low path filter 26 is a sine wave with a frequency equal to the driving frequency, and an output VB from the bandpass filter 28 is a sine wave corresponding to a frequency 3 times the driving frequency. Since the selection means 24 switches the output terminal of the voltage dividing means 23 to obtain the smallest output of the amplitude detection means 29, the output can be set to obtain the optimal voltage dividing ratio while vibrating the piezoelectric vibrator 1.

Figure 13:
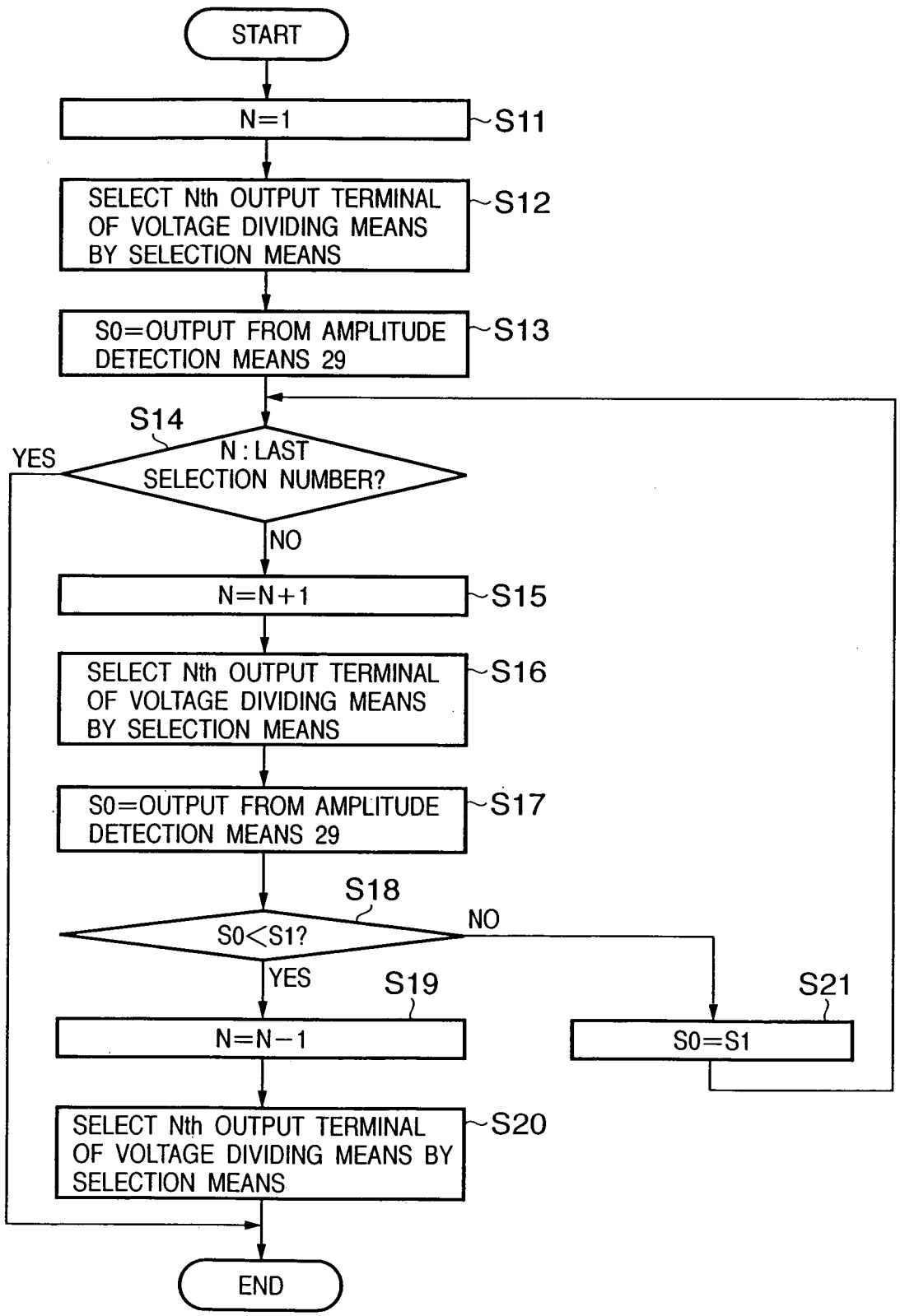
FIG. 13 is a flowchart showing an operation according to the fifth embodiment.

FIG. 13 shows a flowchart of setting the optimal voltage dividing ratio.

First, 1 is assigned to a selection number N (step S11), and the selection means 24 selects the Nth output terminal of the voltage dividing means (step S12). The output from the amplitude detection means 29 is then assigned to a variable S0 (step S13).

If the selection number N is the last selection number, the process is ended. Otherwise, 1 is added to the selection number N, and then the selection number N is set to the selection means 24 (steps S14, S15, and S16).

The output from the amplitude detection means 29 is received, and assigned to a variable S1 (step S17).

The size of the variable S0 is compared with that of the variable S1. When the size of the variable S0 is smaller, 1 is subtracted from the selection number N, and the selection number N is set to the selection means 24 to end the process (steps S18, S19, and S20).

When the size of the variable S0 is equal to or larger than that of the variable S1, the variable S1 is assigned to the variable S0, and this process is repeated until the selection number is determined (step S21).

As described above, the output terminal of the voltage dividing means 23 is selected such that the minimum output voltage can be obtained from the amplitude detection means 29.

The higher the predetermined frequency is obtained, the higher the output voltage is obtained when shifting the voltage dividing ratio. Hence, a sufficiently higher frequency than the resonance frequency of the piezoelectric vibrator 1 is used, the more easily the optimal voltage dividing ratio is set. In this embodiment, the harmonic component is used. However, the actual driving may be executed after actually applying the high-frequency driving voltage before actuating, to obtain the optimal voltage dividing ratio.

The present invention is not limited to the above embodiments and various changes and modifications can be made within the spirit and scope of the present invention. Therefore, to apprise the public of the scope of the present invention the following claims are made.

Claim of Priority

This application claims priority from Japanese Patent Application No. 2003-385189, entitled "CURRENT DETECTION CIRCUIT AND CURRENT DETECTION METHOD" and filed on Nov. 14, 2003, which is hereby incorporated by reference herein.

What is claimed is:

1. A current detection circuit which applies an AC voltage to a vibrator which converts electricity into a mechanical energy to vibrate, and detects a mechanical branch current serving as a current component which contributes to the vibration of the vibrator, comprising:
   a series circuit which connects a capacitor to the vibrator in series;
   a voltage dividing circuit, connected to said series circuit in parallel, which divides and extracts a voltage applied across said series circuit; and
   a detection circuit which detects a difference between, of the divided voltages, a terminal voltage other than the voltage applied across said series circuit and a voltage at a connection portion between the vibrator and the capacitor in said series circuit.

2. The current detection circuit according to claim 1, wherein said voltage dividing circuit has at least two voltage dividing ratios, and selects one of the divided voltages, wherein said detection circuits detects a difference between the selected voltage and the voltage at the connection portion between the vibrator and the capacitor.

3. The current detection circuit according to claim 1, wherein said detection circuit includes a first detection circuit which detects the voltage at the connection portion, a second detection circuit which detects the voltage applied across said series circuit or the voltage obtained by dividing the voltage applied across said series circuit, and a third detection circuit which detects a phase difference between the voltages, wherein a value corresponding to the mechanical branch current is detected by using output values from said first detection circuit and second detection circuit.

4. The current detection circuit according to claim 2, wherein said voltage dividing circuit is arranged by connecting a plurality of resistance elements in series.

5. The current detection circuit according to claim 1, further comprising a differentiating circuit which differentiates a detection value of an output voltage from said detection circuit.

6. The current detection circuit according to claim 5, wherein said differentiating circuit includes a first differentiating circuit and a second differentiating circuit which differentiates the voltage at the connection portion and the divided voltage, respectively, and said detection circuit detects a difference between differentiating values of said first differentiating circuit and second differentiating circuit.

7. The current detection circuit according to claim 6, wherein said differentiating circuit detects a gradient close to an average of detection values from said detection circuit.

8. A method of applying an AC voltage to a vibrator, and detecting a mechanical branch current serving as a current component which contributes to a vibration of the vibrator in a circuit including a series circuit in which a capacitor is connected in series to the vibrator which converts electricity into a mechanical energy to vibrate, and a voltage dividing circuit connected to the series circuit in parallel, for dividing a voltage applied across the series circuit, comprising the steps of:
   extracting, of the divided voltages, a terminal voltage other than the voltage applied across the series circuit;
   detecting a difference between the extracted voltage and a voltage at a connection portion between the vibrator and the capacitor in the series circuit; and
   detecting the mechanical branch current by using the detection result.

9. The method according to claim 8, wherein the voltage dividing circuit has at least two voltage dividing ratios, wherein said voltage dividing circuit selects one of the divided voltages, and detects a difference between the selected voltage and the voltage at the connection portion between the vibrator and the capacitor.

10. The method according to claim 9, wherein the voltage dividing circuit selects a voltage with a minimum amplitude of the divided voltages when applying the AC voltage with a predetermined frequency.

11. The current detection circuit according to claim 1, wherein a voltage dividing ratio of the voltage dividing circuit is determined in accordance with a ratio of the capacitor in the series circuit and a damping admittance in an equivalent circuit of the vibrator.

12. The current detection circuit according to claim 1, wherein a voltage dividing ratio of the voltage dividing circuit is equal to a ratio of the capacitor in the series circuit and a damping admittance in an equivalent circuit of the vibrator.

13. The current detection circuit according to claim 1, wherein said voltage dividing circuit selects one of the divided voltages based on a ratio of the capacitor in the series circuit and a damping admittance in an equivalent circuit of the vibrator.

* * * * *